(12) United States Patent
Berg et al.

(10) Patent No.: US 6,850,756 B2
(45) Date of Patent: Feb. 1, 2005

(54) METHOD OF CHARGING FOR TELECOMMUNICATIONS LINKS WITHIN THE CONTEXT OF CALL FORWARDING SERVICES

(75) Inventors: Andreas Berg, Berlin (DE); Ronald Heine, Fredersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 536 days.

(21) Appl. No.: 10/078,158

(22) Filed: Feb. 20, 2002

(65) Prior Publication Data

US 2002/0123324 A1 Sep. 5, 2002

(30) Foreign Application Priority Data

Feb. 20, 2001 (DE) .......................................... 101 09 906

(51) Int. Cl.⁷ ............................................ H04M 11/00
(52) U.S. Cl. .................. 455/406; 455/405; 379/114.22; 379/114.01; 379/114.21; 379/114.23
(58) Field of Search ................................ 455/405–411; 379/111, 112.01, 114.01, 114.1, 114.21, 114.22, 120, 126, 127.01, 127.05, 211.02, 200.01, 221.01

(56) References Cited

U.S. PATENT DOCUMENTS

| | | | |
|---|---|---|---|
| 5,579,379 A | 11/1996 | D'Amico et al. | |
| 5,991,377 A | 11/1999 | Malik | |
| 6,018,575 A | * 1/2000 | Gross et al. | ........... 379/220.01 |
| 6,088,433 A | 7/2000 | Culli et al. | |
| 6,577,718 B1 | * 6/2003 | Kalmanek et al. | ..... 379/114.22 |

* cited by examiner

*Primary Examiner*—Duc Nguyen
(74) *Attorney, Agent, or Firm*—Morrison & Foerster LLP

(57) ABSTRACT

The invention relates to a method for charging for telecommunications links in a communications network. When a setup request for a communications link which is directed to a communications terminal and incurs a charge for a charge account associated with the communications terminal is deleted, a network node in the communications network performs sequences for setting up the communications link and forwarding sequences for setting up a forwarding communications link. To bill telecommunication charges securely and reliably at all times, even in the course of roaming, forwarding information is stored in a memory network node in the communications network during the forwarding sequences. Debiting of communication charges for the communications link from the charge account associated with the communications terminal is prevented if the memory network node stores the forwarding information.

7 Claims, 2 Drawing Sheets

METHOD OF CHARGING FOR TELECOMMUNICATIONS LINKS WITHIN THE CONTEXT OF CALL FORWARDING SERVICES

CLAIM FOR PRIORITY

This application claims priority to Application No. DE 10109906.1 which was published in the German language on Feb. 20, 2001.

TECHNICAL FIELD OF THE INVENTION

The invention relates to a method of charging for telecommunications links in a communications network, and in particular, to a setup request for a communications link which is directed to a communications terminal and incurs charges for a charge account associated with the communications terminal.

BACKGROUND OF THE INVENTION

In GSM communications networks (GSM=Global System for Mobile Communication), communications links which are, for example, directed to a communications terminal (mobile) and incur charges for a charge account associated with the communications terminal can be set up. This occurs, for example, when the communications terminal is outside its home communications network (HPLMN=Home Public Land Mobile Network) and is activated (registered) in a foreign communications network (e.g. abroad). If the communications terminal is called from the home communications network, the call is forwarded from the home communications network to the foreign communications network (roaming). In this case, the caller only pays charges at a level which is normal in the home communications network for calls within the network. Additionally, the charge account associated with the communications terminal which is in the foreign communications network is billed additional charges for forwarding the call to the foreign communications network.

For the communications terminal activated in the foreign communications network, a "call forwarding service" can be used in the home communications network. It is then possible for a network node in the home communications network, which has a sequence control function and a forwarding sequence control function, to take the setup request for the communications link as a basis for performing sequence steps for setting up the communications link. It is also possible for the network node to take the existence of the call forwarding service as a basis for performing forwarding sequence steps for setting up a forwarding communications link.

On the basis of the call forwarding service, the communications link (for example, from the home communications network to the foreign communications network) which incurs charges for the communications terminal is not actually set up. Instead, a forwarding communications link to a destination prescribed by the call forwarding service is set up. Since the network node in the (home) communications network performs the sequence steps for setting up the charge-incurring communications link, however, it is possible for these sequence steps to carry out charging for this charge-incurring communications link.

SUMMARY OF THE INVENTION

In one embodiment of the invention, there is a method of charging for telecommunications links in a communications network, in which upon the appearance of a setup request for a communications link which is directed to a communications terminal and incurs charges for a charge account associated with the communications terminal. A network node in the communications network uses a sequence control function and a forwarding sequence control function to perform sequences for setting up the communications link, and, if a call forwarding service is available for the communications terminal, the network node in the communications network performs forwarding sequences for setting up a forwarding communications link.

The invention also provides a method which can be used to bill telecommunication charges securely and reliably at all times, even in the course of roaming.

In one aspect of the invention, forwarding information is stored in a memory network node in a communications network during the forwarding sequences, and debiting of communication charges for the communications link from the charge account associated with the communications terminal is prevented if the memory network node stores the forwarding information. Hence, the communication terminal is not billed any communication charges if there is a call forwarding service for the charge-incurring communications link.

The inventive method can be in a form such that, if the sequences are terminated with forwarding information stored, the forwarding information is deleted. Similarly, the method can be in a form such that when the forwarding sequences are terminated the forwarding information is deleted. A particular advantage of the two aforementioned aspects of the inventive method is that the forwarding information is deleted after termination of the sequences or after termination of the forwarding communications link, and thus no memory space is subsequently used by the forwarding information.

In another aspect of the invention, the forwarding information is stored by setting a binary memory element which can be associated with the communications terminal, and the forwarding information is deleted by resetting the binary memory element. The use of a binary memory element (for example a "flag") allows the forwarding information to be stored with little technical complexity.

In another aspect of the invention, the communications terminal's charge account used is a prepaid credit charge account. Particularly when using a communication method with prepaid credit charge accounts (PPS=Prepaid service), secure, reliable and correct billing of the communication charges is particularly important, since a PPS method involves debiting the communication charges from the account while the communications link actually exists (online charging), and subsequent correction of a charge debit is possible only with great complexity.

In still another aspect of the invention, the memory network node used is the network node in the communications network with the sequence control function and the forwarding sequence control function. The advantage is that the forwarding information is stored in the same network node as that in which the sequences and the forwarding sequences are controlled. Hence, no exchange of messages between various network nodes in the communications network is necessary in order to store and delete the forwarding information.

In another aspect of the invention, a service control point is used as the network node in the communications network with the sequence control function and the forwarding sequence control function, the communications network having a structure associated with an intelligent network. The inventive method can be implemented relatively easily and inexpensively in a service control point in an intelligent network.

BRIEF DESCRIPTION OF THE DRAWINGS

To explain the invention further.

DETAILED DESCRIPTION OF THE PREFERRED EMBODIMENTS

Figure 1:
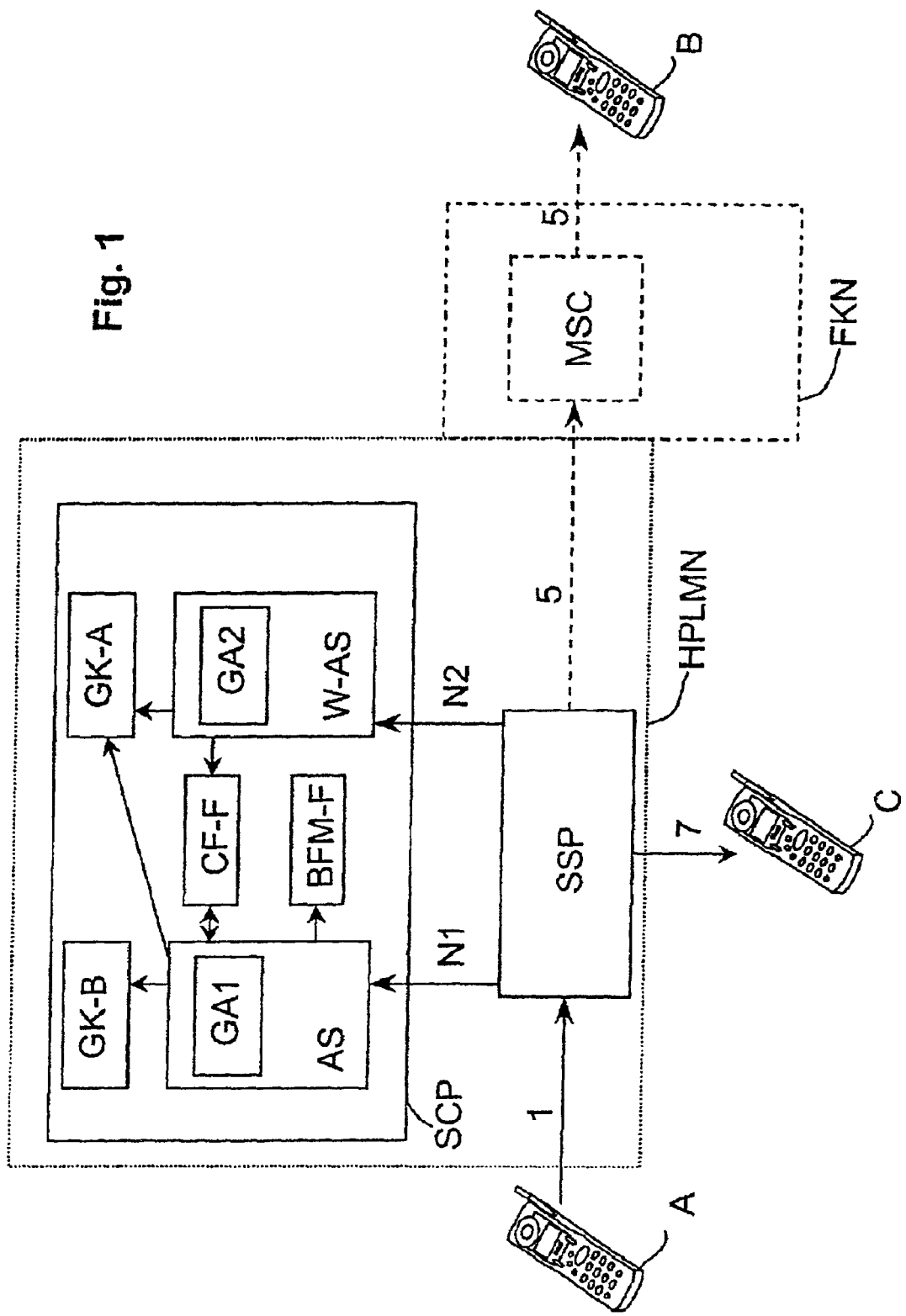
FIG. 1 shows an exemplary network in accordance with the invention.

FIG. 1 shows a caller's communications terminal A associated with a home communications network HPLMN. From the caller's communications terminal A, a communications link needs to be set up to a communications terminal B which is likewise associated with the home communications network HPLMN, the communications terminal B being activated (registered) in a foreign communications network FKN. The caller's communications terminal A sends a setup request 1 to a switching center SSP in the home communications network HPLMN. In this exemplary embodiment, the home communications network HPLMN has a structure associated with an "intelligent network," (IN) and the switching center SSP operates as a "service switching point" (SSP). To produce the desired communications link between the caller's communications terminal A and the communications terminal B, a message N1 is sent from the service switching point SSP to a service control point SCP. The service control point SCP is a network node in the home communications network HPLMN which has a sequence control function for controlling the setup of the communications link. The message N1 transmitted to the service control point SCP is taken as a basis for the service control point SCP to perform sequences AS for setting up the communications link between the caller's communications terminal A and the communications terminal B. These sequences AS are shown schematically in FIG. 1 as an element denoted "AS".

The communications link between the caller's communications terminal A and the communications terminal B can incur charges for the communications terminal B. Incur of charges for the called communications terminal arises, by way of example, when the communications terminal B is not in its home communications network but rather in a foreign communications network (e.g. abroad). This is only one example of a communications link which incurs charges for a called communications terminal, however. It is likewise possible for communication charges to be incurred for the called subscriber in the case of communications links within just one communications network as well.

In the case shown in FIG. 1, the sequences AS comprise GA1 for charge billing for the communication charges incurred by the communications terminal B. From the standpoint of the communications terminal B, an incoming call is assumed to arrive (MTC=mobile terminating call). Hence, GA1 for charge billing is also called charge billing for MTC, and the sequences AS are also called MTC service logic.

If a communications link 5—shown in dashes in FIG. 1—between the caller's communications terminal A and the communications terminal B were actually set up (possibly using other switching centers MSC in the foreign communications network), GA1 for charge billing would bill the communication charges incurred by communications terminal B and would debit these charges from a charge account GK-B associated with the communications terminal B. However, in the present case, a communications link 5 is not actually set up, since there is a call forwarding service for the communications terminal B. This call forwarding service has the task of connecting communications links directed to the communications terminal B not to the communications terminal B, but rather of setting up a forwarding communications link 7 to a destination communications terminal C. Thus, a call forwarding service is also referred to by the abbreviation (CF). In the case illustrated, call forwarding is used which can always be carried out irrespective of the presence of conditions, so-called call forwarding unconditional Cfu. However, the method can likewise be used for other types of forwarding services, such as for forwarding in which the communications terminal B is already being used for telephony (call forwarding busy), in which the communications terminal B does not take a call (call forwarding no answer) or in which the communications terminal B cannot be reached (call forwarding not reachable). The latter case can arise, by way of example, when the communications terminal is off or when the location of the communications terminal B does not have sufficient network coverage. Information about the exact type of the respective call forwarding service available is stored in the home communications network HPLMN in a special network node, for example in the home location register HLR. This register is not shown in FIG. 1.

The home location register HLR transmits (not shown in FIG. 1) to the service switching point SSP information about the call forwarding service available in this example—call forwarding unconditional—and the service switching point SSP then sends a further message N2 to the service control point SCP. The service control point SCP then activates its forwarding sequence control function and performs forwarding sequences W-AS. These forwarding sequences W-AS are shown in FIG. 1 as an element denoted "W-AS". The forwarding sequences W-AS include GA2 for billing charges for the call forwarding. The forwarding sequences W-AS taking place ensure that the service switching point SSP sets up the forwarding communications link 7 to the destination communications terminal C. The necessary address of the destination communications terminal C for this purpose has likewise been transmitted by the home location register HLR (not shown) to the service switching point SSP in advance. Since the destination communications terminal C, just like the calling communications terminal A, is activated (registered) in the home communications network HPLMN, the charges for a communications link which is to be set up within the home communications network HPLMN become due. These charges are billed to the caller's communications terminal A by in GA2 for billing charges for the call forwarding in the forwarding sequences W-AS, and these charges are debited from a caller's charge account GK-A. However, charge billing GA1 does not need to calculate any communication charges for the communications terminal B, since the communications link 5 has not been set up to the communications terminal B. For this purpose, the service control point SCP (which serves as memory network node in this case) includes a flag CF-F, as binary memory element, for storing forwarding information, and additionally includes a block flag BFM-F as a further memory location. The flag LF-F can be accessed both by the sequences AS and by the forwarding sequences W-AS. The exact interaction between the sequences AS, the flag CF-F and the forwarding sequences W-AS is shown in FIG. 2.

Figure 2:
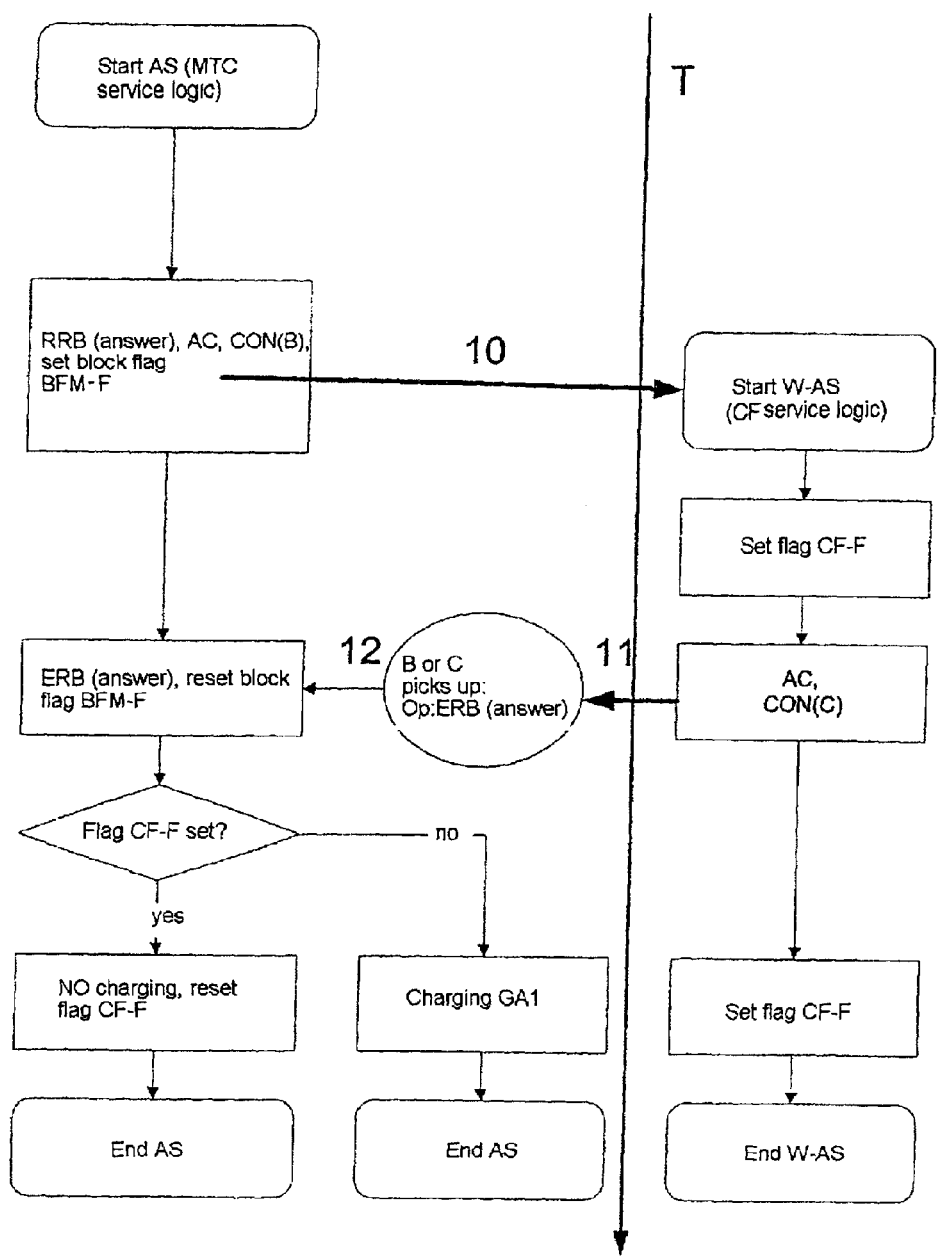
FIG. 2 shows an exemplary flowchart for sequences of the sequence control function and for forwarding sequences of the forwarding sequence control function.

FIG. 2 shows an arrow T pointing vertically downward which represents a timeline. To the left of the arrow T, the sequences AS of the sequence control function are shown in the manner of a sequence chart, and to the right of the arrow T, the forwarding sequences W-AS of the forwarding sequence control function are shown. The sequences AS of the sequence control function (which is also referred to as MTC service logic) are started (top left-hand corner of FIG. 2) when the first message N1, mentioned in connection with FIG. 1, reaches the service control point SCP (cf. FIG. 1). First, an operation RRB(answer) is performed which activates an Event Detection Point No 7 of the Basic Call State Model (BCSM). This activation is also called arming. The operation RRB(answer)=Request Report BCSM Event (answer) involves, just like operations AC=Apply Charging, CON=Connect, IDP=Initial Detection Point and ERB (answer)=Event Report BCSM(answer) mentioned later, operations which are used within the context of the communication protocol INAP (Intelligent Network Application Protocol).

Next, the operation AC is used to prepare the billing of the communication charges for the communications terminal B (cf. FIG. 1). The operation CON (B) is then performed. This operation instructs the service switching point SSP to set up the communications link 5 to the communications terminal B. However, since a call forwarding service is active for the communications terminal B, the service switching point SSP does not set up the communications link 5 (cf. FIG. 1), but rather a further message N2 is sent to the service control point SCP. This further message N2 ensures that the forwarding sequences W-AS start to be performed in the service control point SCP. This is symbolized in FIG. 2 by the top horizontal arrow 10, whose arrow tip points to the starting point of the forwarding sequences W-AS. (The messages N1 and N2 can be messages of the type Initial Detection Point (IDP), for example.

Directly after the operation CON(B) has been performed, the sequences AS set the block flag BFM-F in the service control point SCP. This flag ensures that the communications terminal B cannot take another call (BFM F=Block Further Mobile Terminating Calls-Flag). The sequences AS then wait for the arrival of an operation ERB(answer) from the forwarding sequences W-AS.

The forwarding sequences W-AS shown on the right of the arrow T first set the flag CF-F when they have started. In this way, forwarding information is stored. Next, a further operation AC is performed in order to prepare the charging for the forwarding communications link, and the operation CON(C) is then used to set up the forwarding communications link 7 from the caller's communications terminal A to the destination communications terminal C via the service switching point SSP. If the destination communications terminal C takes the call, the forwarding sequences W-AS use an operation ERB(answer) to notify the sequences AS of this. This is symbolized in FIG. 2 by two horizontal arrows 11 and 12. However, the sequences AS cannot tell from the operation ERB(answer) whether the call has been taken on the destination communications terminal C or on the communications terminal B. The sequences are merely notified that the call has been taken.

It is now possible to continue performing the sequences AS which have waited for the arrival of the operation ERB(answer). When the operation ERB(answer) has arrived, the sequences reset the block flag BFM-F, so that the communications terminal B can now take other calls.

The sequences AS then evaluate the flag CF-F. If the flag CF-F has been set, GA1 for charge billing does not perform charge billing for the communications terminal B, since a communications link 5 has not been set up to the communications terminal B, of course. In this case, the flag CF-F can be reset, since the forwarding information is no longer required subsequently. The sequences AS are then terminated. If the flag CF-F has not been set, however, this means that no call forwarding service was available, and consequently the communications link has been set up to the communications terminal B as originally requested, and the charge billing GA1 charges for the communications link 5 incurring charges for the communications terminal B and debits the charge account GK-B accordingly. After the charging has been carried out, the sequences AS are terminated in this case.

At the end of the forwarding communications link 7 (when the forwarding communications link 7 is terminated on the destination communications terminal C, for example), the forwarding sequences W-AS reset the flag CF-F. The forwarding sequences W-AS are then terminated. The forwarding sequences W-AS can charge for the forwarding communications link 7 before they come to an end. This is not shown in FIG. 2, since this charging corresponds to the charging normally found in such communications networks. By way of example, the caller's charge account GK-A can be debited.

The method described above can also be applied advantageously in the situation described below (not shown in the figures): let us assume that the home location register (HLR) of the communications terminal B stores information for the latter regarding a "call forwarding not reachable" service submitted for the communications terminal B. This service ensures that, if the communications terminal B cannot be reached (for example because it is turned off), the forwarding communications link 7 is set up instead of the communications link 5.

Another prerequisite is that the communications terminal B cannot be reached. If a communications link now needs to be set up to the communications terminal B, then the service switching point SSP and the home location register (HLR) perform "Camel 2Step Interrogation". The aim of Camel 2Step Interrogation is to transmit to the home location register (HLR) a telephone number (mobile station roaming number MSRN) on which the communications terminal B can currently be reached. After a first interrogation in the Camel 2Step Interrogation, the sequences AS are started in the service control point SCP. A second interrogation in the Camel 2Step Interrogation is then performed. In this case, the home location register HLR sends a message PRN (Provide Roaming Number) to that visitor location register VLR which was previously responsible for the communications terminal B. Since the communications terminal B cannot be reached, however, the visitor location register VLR returns an error message instead of the expected "mobile station roaming number MSRN". The home location register tells from this error message that the "call forwarding not reachable" service now needs to be implemented and prompts the service switching point SSP to trigger the start of forwarding sequence steps W-AS in the service control point SCP by sending the message N2 to the latter. In this case, the message N2 sent is a message InitialDetectionPoint IDP. In the subsequent course of the sequences AS and forwarding sequences W-AS shown in FIG. 2, the method in line with the application then ensures that the sequences AS do not bill any communication charges for the communications link 5 which was not set up.

What is claimed is:

1. A method of charging for telecommunications links in a communications network, in which a setup request is detected for a communications link which is directed to a communications terminal and incurs a charge for a charge account associated with the communications terminal, comprising:

performing sequences for setting up the communications link via a network node in the communications network with a sequence control function;

forwarding sequences for setting up a forwarding communications link if a call forwarding service is available for the communications terminal;

storing forwarding information in a memory network node in the communications network during the forwarding sequences; and preventing debiting of communication charges for the communications link from the charge account associated with the communications terminal if the memory network node stores the forwarding information.

2. The method as claimed in claim 1, wherein if the sequences are terminated with forwarding information stored, the forwarding information is deleted.

3. The method as claimed in claim 1, wherein when the forwarding sequences are terminated, the forwarding information is deleted.

4. The method as claimed in claim 1, further comprising:

storing the forwarding information by setting a binary memory element which can be associated with the communications terminal; and deleting the forwarding information by resetting the binary memory element.

5. The method as claimed in claim 1, wherein the charge account used is a prepaid credit charge account.

6. The method as claimed in claim 1, wherein the memory network node used is the network node in the communications network with the sequence control function and the forwarding sequence control function.

7. The method as claimed in claim 1, wherein a service control point is used as the network node in the communications network with the sequence control function and the forwarding sequence control function, the communications network having a structure associated with an intelligent network.

* * * * *